US007009806B2

(12) United States Patent
Zayas et al.

(10) Patent No.: US 7,009,806 B2
(45) Date of Patent: *Mar. 7, 2006

(54) ACCURATE TRACKING OF COIL RESISTANCE

(75) Inventors: Fernando A. Zayas, Loveland, CO (US); Michael Chang, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 226 days.

This patent is subject to a terminal disclaimer.

(21) Appl. No.: 10/369,314

(22) Filed: Feb. 19, 2003

(65) Prior Publication Data

US 2004/0160698 A1 Aug. 19, 2004

(51) Int. Cl.
*G11B 5/596* (2006.01)

(52) U.S. Cl. .................................................. 360/78.04

(58) Field of Classification Search ............ 360/78.04, 360/75, 78.06, 78.07, 78.09; 318/254, 432, 318/433, 434

See application file for complete search history.

(56) References Cited

U.S. PATENT DOCUMENTS

| | | | | |
|---|---|---|---|---|
| 4,168,457 A | | 9/1979 | Rose | |
| 4,524,398 A | | 6/1985 | Fujiki | |
| 4,691,152 A | | 9/1987 | Ell et al. | |
| 4,697,127 A | * | 9/1987 | Stich et al. | 318/561 |
| 4,755,892 A | | 7/1988 | Carteau et al. | |
| 4,864,437 A | | 9/1989 | Couse et al. | |
| 4,876,491 A | | 10/1989 | Squires et al. | |
| 4,920,462 A | | 4/1990 | Couse et al. | |
| 4,933,785 A | | 6/1990 | Morehouse et al. | |
| 4,967,291 A | | 10/1990 | Touchton et al. | |
| 5,034,837 A | | 7/1991 | Schmitz | |
| 5,119,250 A | | 6/1992 | Green et al. | |
| 5,223,993 A | | 6/1993 | Squires et al. | |
| 5,231,549 A | | 7/1993 | Morehouse et al. | |
| 5,296,790 A | | 3/1994 | Fincher | |
| 5,363,359 A | | 11/1994 | Lee | |
| 5,379,171 A | | 1/1995 | Morehouse et al. | |
| 5,404,636 A | | 4/1995 | Stefansky et al. | |
| 5,426,545 A | | 6/1995 | Sidman et al. | |
| 5,485,323 A | | 1/1996 | Anderson et al. | |
| 5,510,939 A | | 4/1996 | Lewis | |
| 5,532,889 A | | 7/1996 | Stefansky et al. | |
| 5,592,349 A | | 1/1997 | Morehouse et al. | |
| 5,615,064 A | * | 3/1997 | Blank et al. | 360/75 |
| 5,663,846 A | * | 9/1997 | Masuoka et al. | 360/75 |
| 5,760,992 A | * | 6/1998 | Phan et al. | 360/78.07 |
| 5,768,045 A | | 6/1998 | Patton, III et al. | |

(Continued)

FOREIGN PATENT DOCUMENTS

EP 1 115 064 7/2001

OTHER PUBLICATIONS

U.S. Appl. No. 10/368,743, filed Feb. 19, 2003, Zayas.

(Continued)

*Primary Examiner*—David Hudspeth
*Assistant Examiner*—Fred F. Tzeng
(74) *Attorney, Agent, or Firm*—Fliesler Meyer LLP

(57) ABSTRACT

Methods and computer program products for determining accurate estimates of coil resistance are provided. Current differences between pairs of current values are determined. Additionally, voltage differences between pairs of actuator coil voltages (corresponding to the current values) are determined. Coil resistance is estimated based on the current differences and the voltage differences. These coil resistance estimates can be useful for accurately estimating actuator coil, actuator arm and/or head velocity.

40 Claims, 5 Drawing Sheets

U.S. PATENT DOCUMENTS

| | | | | |
|---|---|---|---|---|
| 5,781,363 | A | 7/1998 | Rowan et al. | |
| 5,844,743 | A | 12/1998 | Funches | |
| 5,863,393 | A | 1/1999 | Hu | |
| 5,917,672 | A * | 6/1999 | Pham et al. | 360/78.09 |
| 5,936,788 | A | 8/1999 | Boutaghou et al. | |
| 5,949,608 | A | 9/1999 | Hunter | |
| 6,040,671 | A * | 3/2000 | Brito et al. | 318/603 |
| 6,064,539 | A | 5/2000 | Null et al. | |
| 6,081,112 | A * | 6/2000 | Carobolante et al. | 324/177 |
| 6,097,564 | A | 8/2000 | Hunter | |
| 6,115,199 | A | 9/2000 | Bang | |
| 6,154,340 | A * | 11/2000 | Cameron | 360/75 |
| 6,204,629 | B1 | 3/2001 | Rote et al. | |
| 6,222,696 | B1 | 4/2001 | Kim | |
| 6,229,663 | B1 * | 5/2001 | Yoneda et al. | 360/75 |
| 6,243,226 | B1 * | 6/2001 | Jeong | 360/78.07 |
| 6,344,942 | B1 * | 2/2002 | Yarmchuk | 360/75 |
| 6,363,214 | B1 | 3/2002 | Merello et al. | |
| 6,487,033 | B1 | 11/2002 | Heydt et al. | |
| 6,496,319 | B1 | 12/2002 | Kusumoto et al. | |
| 6,512,650 | B1 * | 1/2003 | Tanner | 360/75 |
| 6,560,057 | B1 * | 5/2003 | Klaassen et al. | 360/75 |
| 6,600,618 | B1 * | 7/2003 | Schlager | 360/75 |
| 6,611,118 | B1 * | 8/2003 | Abe et al. | 318/254 |
| 6,614,617 | B1 * | 9/2003 | Galloway | 360/78.06 |
| 6,643,088 | B1 * | 11/2003 | Kawachi | 360/75 |
| 6,661,598 | B1 * | 12/2003 | Kusumoto et al. | 360/75 |
| 6,690,536 | B1 * | 2/2004 | Ryan | 360/78.04 |
| 6,717,763 | B1 * | 4/2004 | Ottesen et al. | 360/75 |
| 6,781,787 | B1 * | 8/2004 | Codilian et al. | 360/78.06 |
| 6,795,268 | B1 * | 9/2004 | Ryan | 360/78.04 |

OTHER PUBLICATIONS

"Delta Voltage Control During Actuator Retract", IBM Technical Disclosure Bulletin, vol. 35, No. 1B, Jun. 1992, pp. 337-339.

R.E. Eaton et al., "Improved Back Electromagnetic Force Voice Coil Motor Controller", IBM Technical Disclosure Bulletin, vol. 38, No. 11, Nov. 1995, pp. 315-316.

"Advanced Servo-Mechanical Design Facilitates Improved Performance and Reliability," 4 pp., Nov. 1999, http://www.ibm.com/harddrive.

"How a Hard Disk Drive Works," 2 pp., Nov. 6, 2002, http://www.duxcw.com/digest/guides/hd/hd5.htm.

Arkin, Michael, "Understanding Head Positioning Systems in Disk Drives—A Primer for the Dynamics of Servo Control," DataTech, Edition 3, Section 4, pp. 61-65, ICG Publishing.

* cited by examiner

ACCURATE TRACKING OF COIL RESISTANCE

CROSS REFERENCE TO RELATED APPLICATION

This application relates to U.S. patent application Ser. No. 10/368,743, entitled ACCURATE TRACKING OF COIL RESISTANCE BASED ON CURRENT, VOLTAGE AND ANGULAR VELOCITY, which was filed the same day as this application, and was commonly invented and commonly assigned.

FIELD OF THE INVENTION

The present invention relates to rotating storage media devices, and more specifically to the accurate tracking of the resistance of a voice coil of a rotating storage media device.

BACKGROUND

During normal operation of a rotating storage media device, a read/write head senses servo signals stored on a disk while the head is located over the disk surface. A servo controller interprets the servo signals, and uses these servo signals to adjust the head's position relative to the disk surface. The servo controller moves the head, either to maintain a desired head position or to travel to a new position, by moving an actuator arm whose tip is secured to the head.

During certain situations, however, servo signals are not available to guide or position the head. In one instance, during ramp load or unload operation, the head is not over the region of the disk surface containing servo data. In another instance, during head retract up a ramp after a power failure, the servo controller is not running. Consequently, guidance of the head to and from a ramp cannot be conducted using servo signals.

To overcome this problem, various methods have been used to attempt to estimate head position by analyzing certain electrical characteristics of an actuator's voice coil motor (VCM). A VCM, which is used to position the actuator arm, generally includes a wound conductive coil (called a voice coil, or actuator coil) secured to the actuator arm, and one or more magnets. The coil is positioned within the magnetic field of the magnets. Applying a current through the voice coil creates a magnetic force that moves the actuator coil (and thus, the actuator arm and the head) relative to the magnet(s).

Estimates of voice coil velocity are used to estimate the position of the voice coil, the actuator arm and the head. Methods for estimating the velocity of the voice coil (and thereby, of the actuator arm and the head) typically rely on accurate determinations of the back electromagnetic field voltage (back EMF voltage, or simply $V_{BEMF}$) present across the voice coil, which is due to the coil's motion through the field of the magnets. More specifically, since the $V_{BEMF}$ is proportional to the voice coil's angular velocity in the ratio of a known constant, it can be used to determine the velocity of the voice coil. For example, the angular velocity of the voice coil can be determined using the following equation:

$$\omega = \frac{1}{K_T} V_{BEMF} \qquad \text{(Equation 1)}$$

where: ω is the angular velocity of the voice coil; $K_T$ is a torque constant; and $V_{BEMF}$ is the back electromagnetic field voltage drop.

Further, the $V_{BEMF}$ can be determined using the following equation:

$$V_{BEMF} = V_{coil} - I_{coil} R_{coil} - L^{di}/_{dt} \qquad \text{(Equation 2)}$$

where $V_{coil}$ is the voltage across the voice coil, $I_{coil}$ is the current through the voice coil, $R_{coil}$ is the resistance of the voice coil, and $L^{di}/_{dt}$ is the voltage across the coil due to a change in current. Combining the above formulas gives:

$$\omega = \frac{1}{K_T}\left(V_{coil} - I_{coil} R_{coil} - L\frac{di}{dt}\right). \qquad \text{(Equation 3)}$$

Thus, $R_{coil}$ is necessary to determine the angular velocity of the voice coil. As mentioned above, resistance of a voice coil (i.e., $R_{coil}$) is typically only determined when the actuator arm is urged against a crash stop, which prevents the arm from moving. When the actuator arm is not moving, the voice coil is also not moving, causing the back EMF (i.e., $V_{BEMF}$) to be zero, and the voltage across the voice coil (i.e., $V_{coil}$) to be entirely due to coil resistance ($R_{coil}$), assuming enough time has passed to allow di/dt to also be zero. In this manner coil resistance has been conventionally measured. However, when the actuator arm is traversing a load/unload ramp, or while over the media, the coil resistance may change due to environmental variations, such as temperature variations. Accordingly, there is a need to more accurately keep track of the coil resistance.

DETAILED DESCRIPTION

Figure 1:
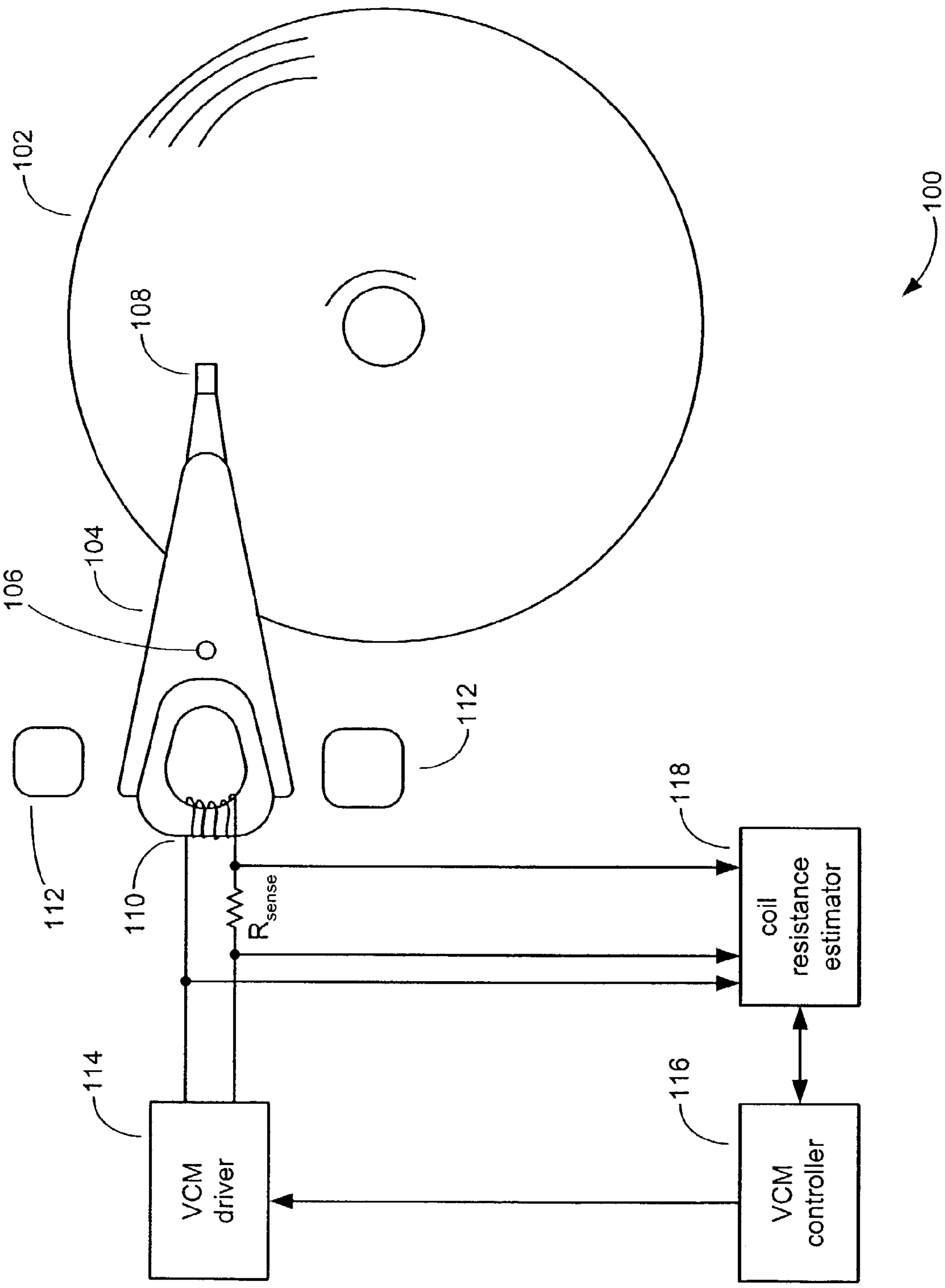
FIG. 1 is a diagram showing portions of an exemplary rotating storage media device.

Embodiments of the present invention relate to rotating storage media drives, such as, but not limited to, disk drives. FIG. 1 is a high level diagram showing portions of an exemplary disk drive 100. As shown in FIG. 1, the drive 100 includes a disk 102, which may include one or more magnetic digital data storage disks or optical disks. An actuator arm 104 is positioned proximate the disk 102, and pivots about a point 106 (e.g., which maybe an actuator shaft). Attached to the actuator arm 104 is a read/write head 108, which can include one or more transducers for reading data from and writing data to a magnetic medium, an optical head for exchanging data with an optical medium, or another suitable read/write device. Also, attached to the actuator arm 104 is an actuator coil 110, which is also known as a voice coil or a voice actuator coil. The voice coil 110 moves relative to one or more magnets 112 when current flows through the voice coil 110. The magnets 112 and the actuator coil 110 are parts of a voice coil motor (VCM), which applies a force to the actuator arm 104 to rotate it about the pivot point 106.

Figure 2:
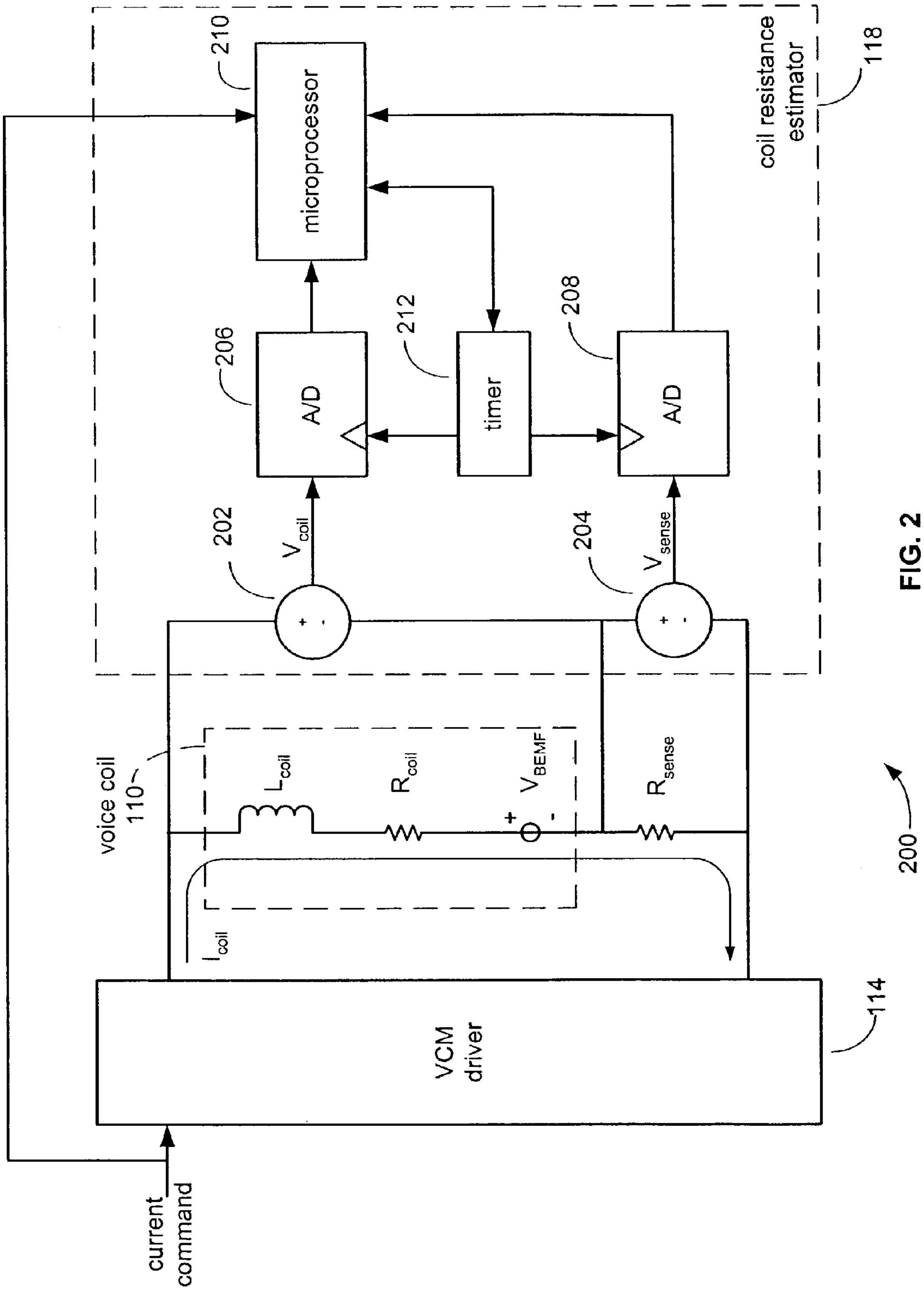
FIG. 2 is a diagram showing a subsystem for estimating coil resistance, according to embodiments of the present invention.

The drive 100 is also shown as including a VCM driver 114, also known as an actuator driver. A VCM controller 116 (which can be part of a servo controller) guides the actuator arm 104 to position the read/write head 108 over a desired track, and moves the actuator arm 104 up and down a ramp (not shown). A sense resistor ($R_{sense}$), discussed in more detail in the discussion of FIG. 2, is shown as being is series with the voice coil 110. A coil resistance estimator 118, of the present invention, can provide accurate estimates of coil resistance.

The drive 100 can further include additional components (not shown), such as a ramp across which the actuator arm 104 moves to a parked position, a latch to hold the actuator arm in the parked position, a crash stop, a disk drive housing, bearings, and a variety of other components. The components, which have not been shown for ease of illustration, can be provided by commercially available components, or components whose construction would be apparent to one of ordinary skill in the art reading this disclosure.

Typically, resistance of the voice coil 110 is only determined when the actuator arm 104 is loaded onto the ramp (not shown). More specifically, the actuator arm 104 is typically urged toward a crash stop (not shown), which prevents the arm from moving. When the actuator arm 104 is not moving, the voice coil 110 is also not moving, causing the back EMF (i.e., $V_{BEMF}$) to be zero. Thus, while urged against the crash stop, the voltage across the voice coil 110 (i.e., $V_{coil}$) is due entirely to coil resistance ($R_{coil}$), if enough time has passed to allow di/dt to also be zero. In this manner coil resistance has been conventionally measured. However, when the actuator arm 104 is moving up or down the ramp (not shown), or when the actuator arm 104 is over the disk 102 (and the head 108 is on track or seeking, which may include when in settle state), the coil resistance may change due to environmental variations, such as temperature. In other words, the actual coil resistance when the actuator arm 104 is not against the crash stop will often be different than the coil resistance determined in the conventional manner (i.e., when the actuator arm 104 is against a crash stop).

As mentioned above, accurate coil resistance estimates are necessary to accurately determine the velocity of the coil, especially when the velocity can not be determined based on servo information (e.g., during ramp load or unload). More generally, accurate coil resistance estimates can be used to produce accurate back EMF estimates, which in turn can be used to accurately determine the velocity of the coil 110 (and thereby, the velocity and position of the actuator arm 104 and the head 108). For example, when the actuator arm 104 is moving up or down the ramp, during ramp load or unload, the head 108 is not reading servo information from disk 102. Thus, during the ramp load or unload period, the velocity and position of the actuator arm 104 may rely primarily (or even entirely) on back EMF determinations. Accordingly, there is a need for more accurate estimates of coil resistance. Embodiments of the present invention are directed to providing such accurate estimates of the coil resistance (e.g., accurate estimates of the resistance of actuator coil 110).

Referring now to FIG. 2, a diagram 200 shows circuit components that are representative of the voice coil 110. As shown, the VCM driver 114 provides a voice coil current ($I_{coil}$) that flows through the voice coil 110. The voice coil 110 is shown as including a resistance (represented as resistor $R_{coil}$), an inductance (represented by $L_{coil}$) and a back EMF voltage (represented by $V_{BEMF}$). A sense resistor ($R_{sense}$) is in series with the voice coil 110. The sense resistor ($R_{sense}$) is used to sense the voice coil current ($I_{coil}$) through the voice coil 110. Preferably, the sense resistor ($R_{sense}$) has a relatively small resistance as compared to overall resistance of the voice coil 110. Further, the sense resistor ($R_{sense}$) is preferably highly insensitive to environmental changes (e.g., temperature changes).

A summer 202 (which can be, for example, an operational amplifier) is coupled across the voice coil 110 to output the voltage drop across the coil ($V_{coil}$). Similarly, a summer 204 (e.g., an operational amplifier) is coupled across the sense resistor ($R_{sense}$) to output the voltage drop across the sense resistor ($V_{sense}$). As can be appreciated from FIG. 2, the $V_{coil}$ is equal to the voltage drop across $L_{coil}$, plus the voltage drop across $R_{coil}$ (also known as IR drop), plus $V_{BEMF}$. That is, $V_{coil}$ can be represented by the following equation:

$$V_{coil}=L^{di}/_{dt}+I_{coil}\cdot R_{coil}+V_{BEMF} \qquad \text{(Equation 4).}$$

In operation, the VCM driver 114 receives a digital current command signal (e.g., from the VCM controller 116). The VCM driver 114 converts the digital current commands into an actual current signal, i.e., the voice coil current ($I_{coil}$). The voice coil current flows through the voice coil 110 and the sense resistor ($R_{sense}$), as shown in FIG. 2. The summer 202 outputs a voice coil voltage signal ($V_{coil}$), which is provided to an analog-to-digital (A/D) converter 206. The A/D 206 provides digital samples of the voice coil voltage signal to a microprocessor 210. In accordance with an embodiment of the present invention, the microprocessor 210 also receives the digital current commands. As explained in more detail below, the microprocessor 210 can then determine accurate estimates of the coil resistance using embodiments of the present invention.

The voice coil current ($I_{coil}$) also flows through the sense resistor ($R_{sense}$). In accordance with an embodiment of the present invention, the summer 204 outputs a sense voltage signal ($V_{sense}$), which is provided to an A/D 208. The A/D 208 provides digital samples of the sense voltage to the microprocessor 210. In embodiments where the sense resistor is highly insensitive to environmental changes (e.g., temperature changes), the microprocessor 210 can determine the voice coil current ($I_{coil}$) by dividing the digital samples of the sense voltage ($V_{sense}$) by a known resistance of the sense resistor ($R_{sense}$).

Figure 3:
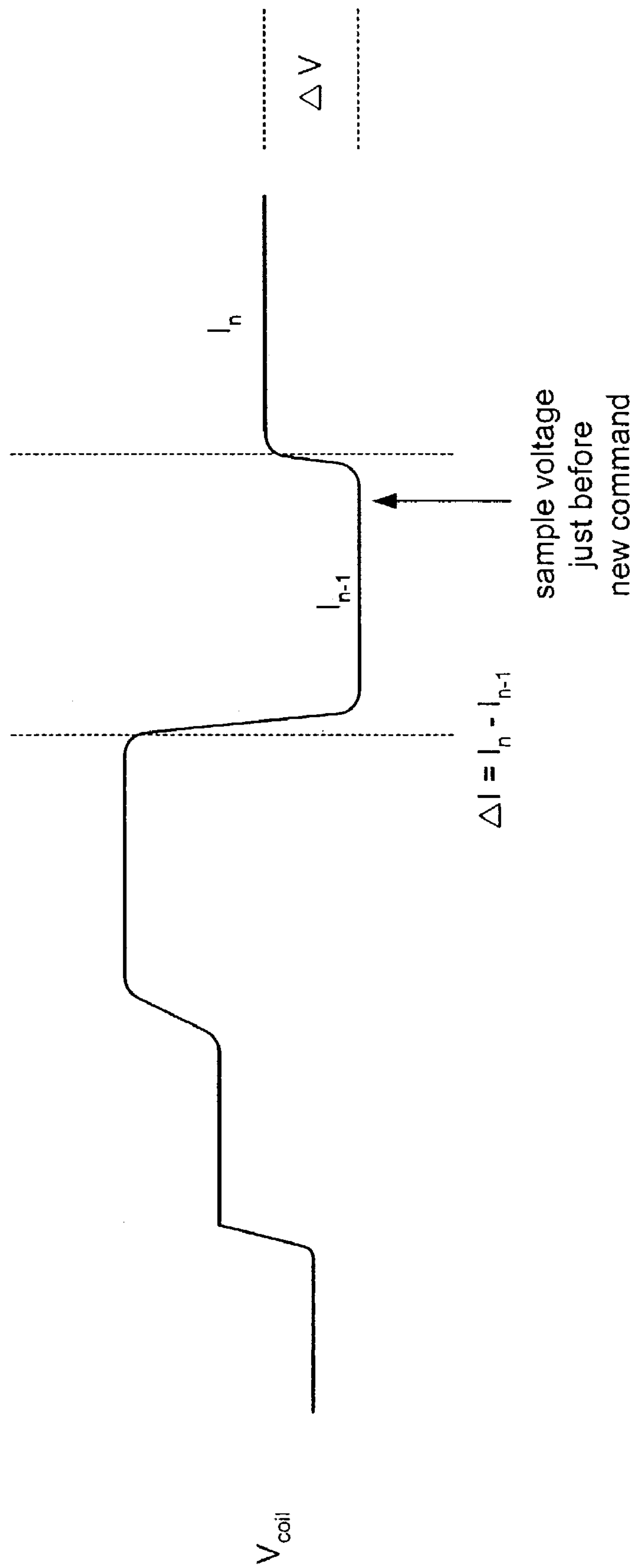
FIG. 3 illustrates an exemplary voice coil voltage signal while track following.

FIG. 3 illustrates an exemplary voice coil voltage signal ($V_{coil}$), over time, while the head 108 is on track. When the head 108 is on track, the coil 110 is not saturated, there is small actuator motion, and toward the end of each control interval (just before a new current command it output), the current in the coil 110 is assumed to have reached a steady state. Each transition (i.e., step) in the voice coil voltage signal is representative of a new current command. As shown, when the current is adjusted (due to a change in the current command signal), the voltage changes. Stated another way, the voice coil voltage looks like a series of steps, with each step resulting from a change in the commanded current. The voice coil voltage signal may look similar during ramp loading or unloading.

In accordance with embodiments of the present invention, the following equation is used to estimate (e.g., periodically) the coil resistance:

$$R_{coil} = \frac{\Delta V}{\Delta I}. \quad \text{(Equation 5)}$$

The ΔV value represents the difference between a pair of voltage drops (e.g., consecutive voltage drops) across the coil 110. The ΔI value represents the difference between a pair of currents (e.g., consecutive currents) through the coil 110. Each ΔV value can be determined by sampling the $V_{coil}$ at least once, for each or some of the current commands sent to the VCM driver 114, and then determining a difference between a pair of coil voltage samples (e.g., output from the A/D 206). As shown in Equation 4 above, $V_{coil}=L^{di}/_{dt}+I_{coil}\cdot R_{coil}+V_{BEMF}$. Thus, $I_{coil}\cdot R_{coil}=V_{coil}-L^{di}/_{dt}-V_{BEMF}$. This leads to Equation 5 being rewritten as follows:

$$R_{coil} = \frac{\Delta\left(V_{coil} - L\frac{di}{dt} - V_{BEMF}\right)}{\Delta I}, \quad \text{(Equation 6)}$$

which leads to the following equation:

$$R_{coil} = \frac{\left(V_{coil} - L\frac{di}{dt} - V_{BEMF}\right)_{n-1} - \left(V_{coil} - L\frac{di}{dt} - V_{BEMF}\right)_{n}}{I_{n-1} - I_n}. \quad \text{(Equation 7)}$$

In accordance with embodiments of the present invention, $V_{coil}$ is sampled just before a new current command is provided to VCM driver 114. This is advantageous because the voltage due to a change in current (i.e., $L^{di}/_{dt}$) will be substantially zero just before the new current command (e.g., within the last 20% of the previous current command interval), and thus it can be assumed that $L^{di}/_{dt}\approx 0$. But even if it is assumed that $L^{di}/_{dt}\approx 0$, $V_{BEMF}$ may still contribute to $R_{coil}$, as can be appreciated from Equation 7. However, in accordance with embodiments of the present invention, it is assumed that the sample to sample variation in angular velocity (ω) from sample to sample is very small. Rearranging Equation 1 above shows that $V_{BEMF}=\omega K_T$, where ω is the angular velocity of the voice coil, and $K_T$ is a torque constant. Thus, if it is assumed that $\omega_{n-1}\approx\omega_n$, then it can further be assumed that the sample to sample variation in $V_{BEMF}$ is small (i.e., that $V_{BEMF,n-1}\approx V_{BEMF,n}$), thereby canceling one another out when determining ΔV. This leads to ΔV value being expressed as $\Delta V=V_{coil,n-1}-V_{coil,n}$(or simply, $\Delta V=\Delta V_{coil}$).

Each ΔI value can be calculated by determining a difference between a pair of current commands (provided to VCM driver 114, and microprocessor 210, as shown in FIG. 2). Alternatively, the microprocessor 210 can determine current values by dividing the digital samples of the sense voltage ($V_{sense}$), produced by the A/D 204, by the known resistance of the sense resistor ($R_{sense}$), because the current through the sense resistor ($R_{sense}$) equals the current through the voice coil 110. In either embodiment, $\Delta I=I_{n-1}-I_n$.

In accordance with an embodiment of the present invention, only those samples corresponding to a current command within some (e.g., a predetermined) tolerance of an estimated bias force are used. When the current command is equal to, or close to, the estimated bias, the angular velocity (ω) of the voice coil can be assumed to not be changing. In other words, if the current command is close to the estimated bias force, e.g., as estimated using a space state estimator, then it is assumed that changes in $V_{BEMF}$ is small (i.e., that $V_{BEMF,n-1}\approx V_{BEMF,n}$), thereby canceling one another out when determining ΔV.

In accordance with some embodiments of the present invention, coil resistance is estimated based on the average of multiple values. This way a bad voltage and/or current value will have less of an effect on coil resistance estimates. For example, the following equation can be used to estimate the coil resistance:

$$R_{coil} = \frac{\sum_{k=1}^{N} \Delta V_k}{\sum_{k=1}^{N} \Delta I_k}. \quad \text{(Equation 8)}$$

The above equation is equivalent to the following equation:

$$R_{coil} = \text{avg}\left(\frac{\Delta V}{\Delta I}\right). \quad \text{(Equation 9)}$$

In accordance with other embodiments of the present invention, the coil resistance is estimated in accordance with the following equation:

$$R_{coil} = \frac{\sum_{k=1}^{N} \Delta V_k \cdot \Delta I_k}{\sum_{k=1}^{N} \Delta I_k \cdot \Delta I_k}. \quad \text{(Equation 10)}$$

More generally, in accordance with various embodiments of the present invention, coil resistance estimates are based on current differences between pairs of current values (e.g., command values or measurements) and voltage differences between corresponding pairs of coil voltages.

Figure 4:
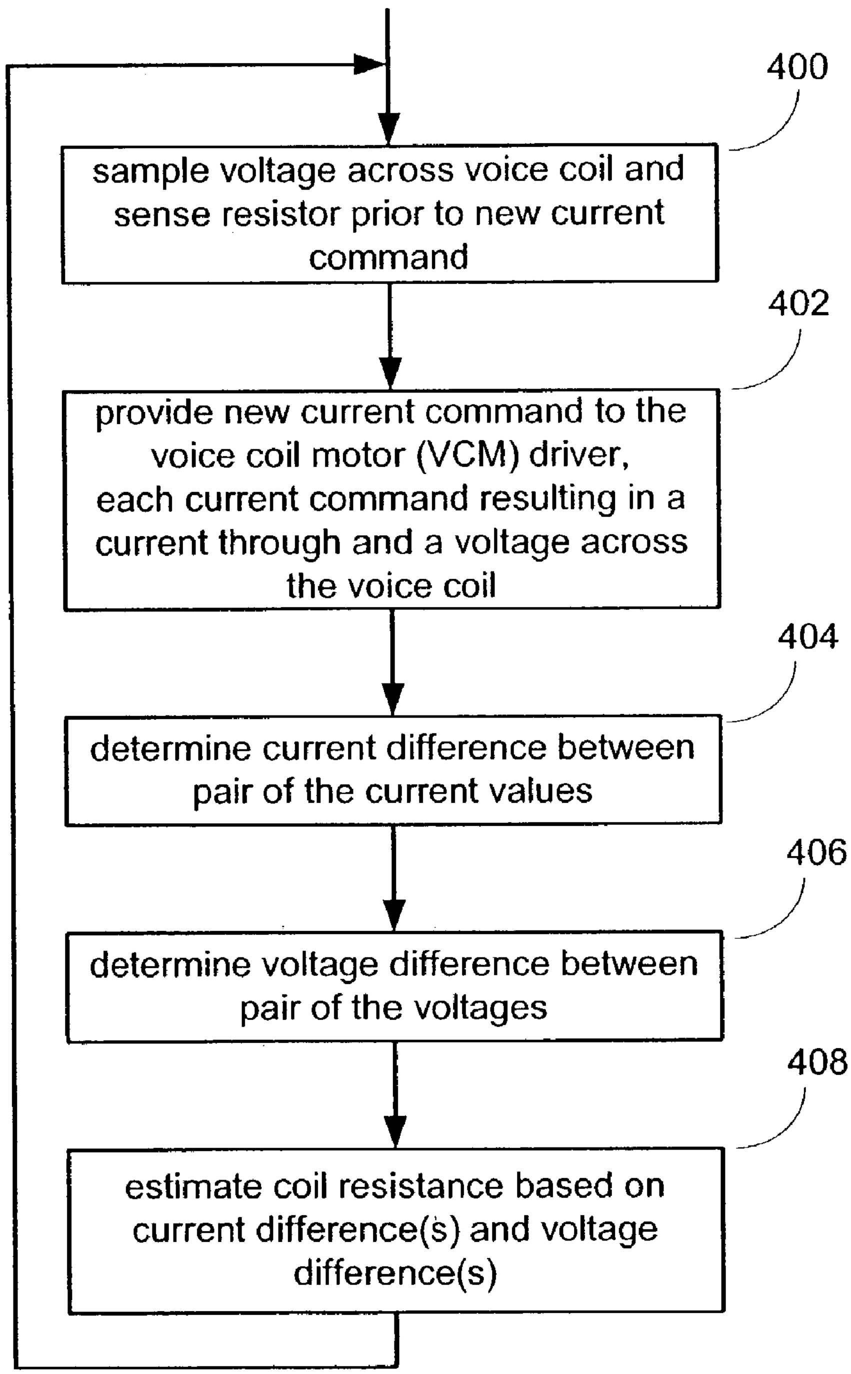
FIGS. 4 and 5 are high level flow diagrams useful for describing methods of the present invention.

FIG. 4 is a high level flow diagram useful for explaining methods for estimating coil resistance, according to embodiments of the present invention described above. Starting at step 400, the voltage across a voice coil (e.g., voice coil 110), and optionally the voltage across a sense resistor (e.g., sense resistor $R_{sense}$), are sampled prior to a new current command. At step 402, a current command is provided to a voice coil motor driver (e.g., voice coil motor driver 114). Each current command results in a current through the voice coil 110, and a corresponding voltage across the voice coil 110. A current difference between a pair of current values, and a voltage difference between a corresponding pair of voltages, are determined at steps 404 and 406. The current values can be current command values or current measurements. Where the current values are current measurements, the current measurements can be determined based on the sampled voltages across the sense resistor (e.g., current measured=voltage sampled/know resistance of the sense resistor). At step 408, coil resistance is estimated based on the current difference(s) and the voltage difference(s), as described above. Steps 400–408 are repeated over time. Preferably, the coil resistance estimates determined at step 408 are based on averages of multiple current differences and averages of multiple voltage differences, as described above. This can be accomplished by repeating steps 400–406 a plurality of time before performing step 408, or by using running averages at step 408.

The steps of the flow diagram are not necessarily performed in the order shown. For example, current differences and voltage differences can be determined in parallel. What occurs at step 402 is not necessarily part of the methods of the present invention, but was included in the flow diagram to better explain embodiments of the present invention.

In accordance with some embodiments of the present invention, rather than assuming that values of $V_{BEMF}$ will cancel each other out, estimates of angular velocity ($\omega$) are determined and used when estimating $R_{coil}$. Such estimates of angular velocity ($\omega$) can be determined using state space estimation models, which are known to those of ordinary skill in the art. In accordance with these embodiments $\Delta V=(V_{coil}-V_{BEMF})_{n-1}-(V_{coil}-V_{BEMF})_n$. Written another way, $\Delta V=(V_{coil,n-1}-V_{coil,n})-(V_{BEMF,n-1}-V_{BEMF,n})$. Remembering that $V_{BEMF}=\omega K_T$, then $\Delta V=(V_{coil,n-1}-V_{coil,n})-(\omega_{n-1}K_T-\omega_n K_T)$. Accordingly, embodiments of the present invention that take into account estimates of angular velocity (e.g., embodiments that do not assume $\Delta V_{BEMF}=0$), $\Delta V$ can be determined using the following equation:

$$\Delta V=\Delta V_{coil}-\Delta\omega K_T \quad \text{(Equation 11).}$$

Equation 11 can be plugged into Equations 5 and 8–10, discussed above.

Figure 5:
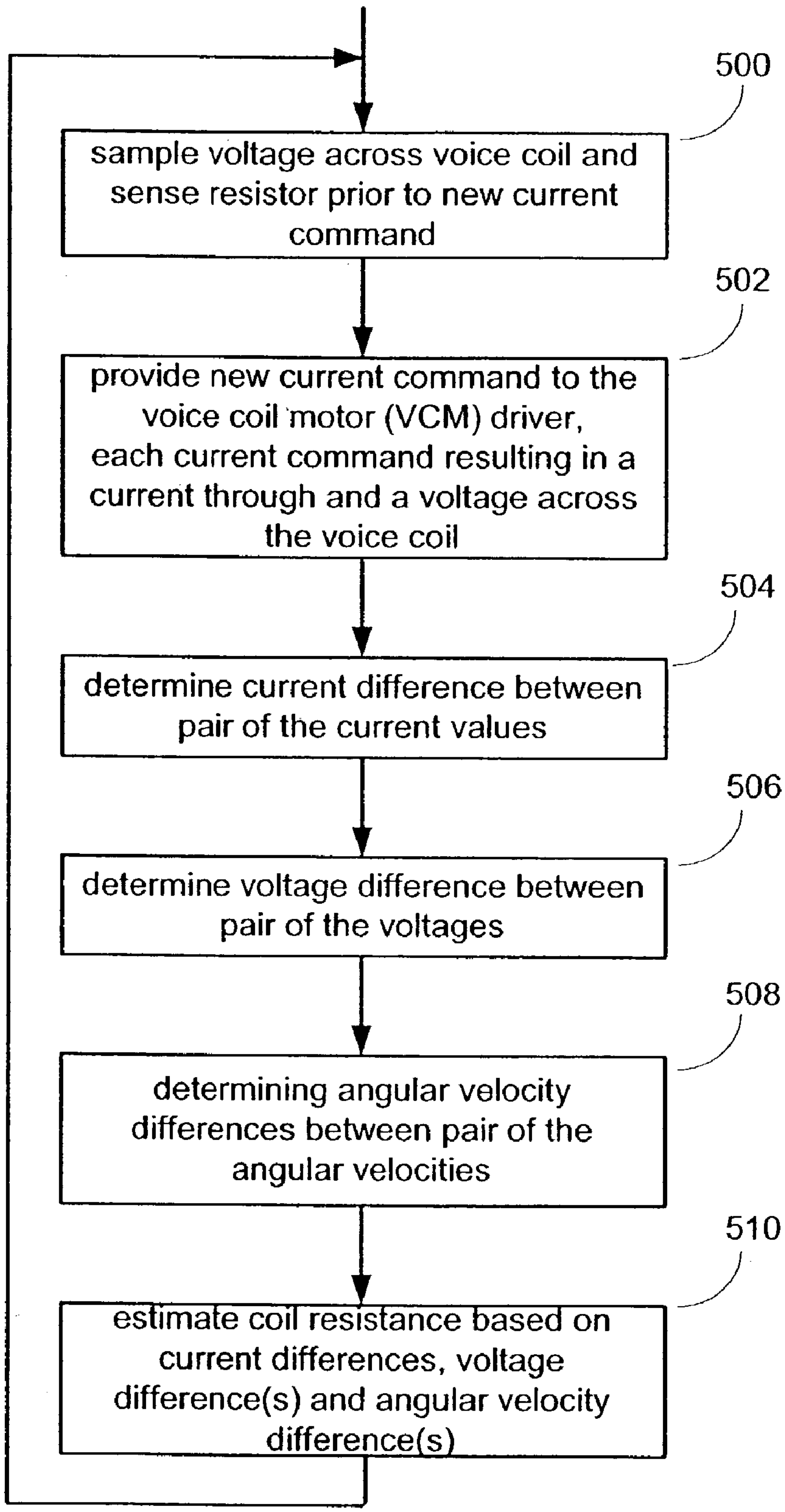

FIG. 5 is a high level flow diagram useful for explaining methods for estimating coil resistance, according to embodiments of the present invention that take into account changes in angular velocity when estimating coil resistance. Steps 500–510 are repeated over time. Preferably, the coil resistance estimates determined at step 510 are based on averages of multiple current differences, multiple voltage differences and multiple angular velocity differences. This can be accomplished by repeating steps 500–508 a plurality of time before performing step 510, or by using running averages at step 510. The steps of this flow diagram are not necessarily performed in the order shown. For example, current differences, voltage differences and angular velocity differences can be determined in parallel. What occurs at step 502 is not necessarily part of the methods of the present invention, but was included in the flow diagram to better explain embodiments of the present invention.

The steps of the flow diagrams of FIGS. 4 and 5 can be performed using the architecture shown in FIG. 2. However, these steps can be performed using other architectures, and accordingly the methods of the present invention are not intended to be limited to use with the architecture in FIG. 2.

The methods of the present invention, can be used to estimate coil resistance while an actuator arm is moving up or down a ramp, or while a head is tracking or seeking. These coil resistance estimates can be useful for accurately estimating actuator coil, actuator arm and/or head velocity, especially during ramp load and unload (but not limited thereby).

Embodiments of the present invention may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

Many features of the present invention can be performed using hardware, software, firmware, or combinations thereof. Consequently, features of the present invention may be implemented using a processing system (e.g., including one or more processors) within or associated with a rotating storage media device (e.g., disk drive 100).

Features of the present invention can be implemented in a computer program product which is a storage medium (media) having instructions stored thereon/in which can be used to program a processing system to perform any of the features presented herein. The storage medium can include, but is not limited to ROMs, RAMs, EPROMs, EEPROMs, DRAMs, VRAMs, flash memory devices, or any type of media or device suitable for storing instructions and/or data.

Stored on any one of the machine readable medium (media), the present invention can include software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented primarily in hardware using, for example, hardware components such as application specific integrated circuits (ASICs). Implementation of the hardware state machine so as to perform the functions described herein will be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the claimed invention.

The breadth and scope of the present invention should not be limited by any of the above-described exemplary embodiments, but should be defined only in accordance with the following claims and their equivalents.

We claim:

1. A method for determining accurate estimates of coil resistance associated with an actuator coil of a voice coil motor (VCM), comprising:

(a) determining a current difference between a pair of current values, wherein each of the current values corresponds to a different current command that is provided to a VCM driver;

(b) determining a voltage difference between a pair of coil voltages corresponding to the pair of current values; and (c) estimating coil resistance based on the current difference and the voltage difference.

2. The method of claim 1, wherein step (a) comprises determining a current difference between a pair of current command values.

3. The method of claim 1, wherein step (a) comprises determining a current difference between a pair of current measurements.

4. The method of claim 1, wherein step (c) comprises estimating the coil resistance using the following equation: $R_{coil}=\Delta V/\Delta I$, where $R_{coil}$ comprises an estimate of the coil resistance, $\Delta V$ comprises the voltage difference, and $\Delta I$ comprises the current difference.

5. The method of claim 4, wherein step (b) comprises determining $\Delta V$ using the following equation:

$$\Delta V = V_{coil,n-1} - V_{coil,n}, \text{ where}$$

$V_{coil,n-1}$ and $V_{coil,n}$ comprise a pair of voltage samples.

6. The method of claim 4, wherein step (b) includes:

determining an angular velocity difference between a pair of angular velocities corresponding to the pair of current values; and determining $\Delta V$ using the following equation:

$$\Delta V = \Delta V_{coil} - \Delta\omega K_T, \text{ where}$$

$V_{coil}$ comprises a difference between a pair of voltage samples, $\Delta\omega$ comprises a difference between a corresponding pair of angular velocity estimates, and $K_T$ is a torque constant.

7. The method of claim 4, wherein step (a) comprises determine a current difference between a consecutive current command values or a consecutive current measurements that correspond to consecutive current commands provided to a VCM driver.

8. The method of claim 4, wherein steps (a) through (c) are performed while traversing a load/unload ramp.

9. The method of claim 4, wherein steps (a) through (c) are performed while a head is on track.

10. The method of claim 4, wherein steps (a) through (c) are performed while a head is seeking.

11. The method of claim 1, further comprising:

repeating steps (a) and (b) a plurality of times, each time with a different pair of current values and coil voltages, to thereby determine a plurality of current differences and voltage differences; and wherein step (c) comprises estimating the coil resistance based on an average of the plurality of current differences and an average of the plurality of voltage differences.

12. The method of claim 1, further comprising:

repeating steps (a) and (b) N times, each time with a different pair of current values and coil voltages, to thereby determine N current differences and N voltage differences, where N>1; and wherein step (c) comprises estimating the coil resistance using the following equation:

$$R_{coil} = \frac{\sum_{k=1}^{N} \Delta V_k \cdot \Delta I_k}{\sum_{k=1}^{N} \Delta I_k \cdot \Delta I_k},$$

where $R_{coil}$ comprises an estimate of the coil resistance, $\Delta V_k$ comprises one of the voltage differences, and $\Delta I_k$ comprises one of the current differences.

13. The method of claim 1, further comprising:

repeating steps (a) through (c) multiple times, each time with a different pair of current values and coil voltages, to thereby continually determine current differences, voltage differences, and estimates of coil resistance.

14. The method of claim 13, wherein each time step (c) is performed, the following equation is used:

$$R_{coil} = \frac{\sum_{k=1}^{N} \Delta V_k \cdot \Delta I_k}{\sum_{k=1}^{N} \Delta I_k \cdot \Delta I_k},$$

where $R_{coil}$ comprises an estimate of the coil resistance, $\Delta V_k$ comprises one of the voltage differences, $\Delta I_k$ comprises one of the current differences, and

N>1.

15. The method of claim 1, further comprising:

(d) using the estimate of coil resistance to determine a back electromagnetic field (back EMF) voltage across the coil.

16. The method of claim 15, further comprising:

(e) using the back EMF to estimate coil velocity.

17. The method of claim 1, wherein steps (a) through (c) are performed while the VCM is moving an actuator arm with respect to a disk.

18. A method for determining accurate estimates of coil resistance associated with an actuator coil of a voice coil motor (VCM), comprising:

(a) determining a current difference between a pair of current command values, wherein each of the current command values corresponds to a different current command that is provided to a VCM driver;

(b) determining a voltage difference between a pair of coil voltages corresponding to the pair of current command values;

(c) repeating steps (a) and (b) a plurality of times, each time with a different pair of current command values and coil voltages, to thereby determine a plurality of current differences and a corresponding plurality of voltage differences; and (d) estimating coil resistance based on the plurality of current differences and the plurality of voltage differences.

19. The method of claim 18, wherein step (d) includes:

determining an average of the plurality of voltage differences;

determining an average of the plurality of current differences; and estimating the coil resistance by dividing the plurality of voltage differences by the plurality of current differences.

20. The method of claim 18, wherein step (d) includes estimating the coil resistance using the following equation:

$$R_{coil} = \frac{\sum_{k=1}^{N} \Delta V_k \cdot \Delta I_k}{\sum_{k=1}^{N} \Delta I_k \cdot \Delta I_k},$$

where $R_{coil}$ comprises an estimate of the coil resistance, $\Delta V_k$ comprises one of the voltage differences, $\Delta I_k$ comprises one of the current differences, and

N>1.

21. A method for determining accurate estimates of coil resistance associated with an actuator coil of a voice coil motor (VCM), comprising:

(a) determining a current difference between a pair of current measurements wherein each of the current measurements corresponds to a different current command that is provided to a VCM driver;

(b) determining a voltage difference between a pair of coil voltages corresponding to the pair of current measurements;

(c) repeating steps (a) and (b) a plurality of times, each time with a different pair of current measurements and coil voltages, to thereby determine a plurality of current differences and a corresponding plurality of voltage differences; and (d) estimating coil resistance based on the plurality of current differences and the plurality of voltage differences.

22. The method of claim 21, wherein step (d) includes:

determining an average of the plurality of voltage differences;

determining an average of the plurality of current differences; and estimating the coil resistance by dividing the plurality of voltage differences by the plurality of current differences.

23. The method of claim 20, wherein step (d) includes estimating the coil resistance using the following equation:

$$R_{coil} = \frac{\sum_{k=1}^{N} \Delta V_k \cdot \Delta I_k}{\sum_{k=1}^{N} \Delta I_k \cdot \Delta I_k},$$

where $R_{coil}$ comprises an estimate of the coil resistance, $\Delta V_k$ comprises one of the voltage differences, $\Delta I_k$ comprises one of the current differences, and $N>1$.

24. A method for determining accurate estimates of coil resistance associated with an actuator coil of a voice coil motor (VCM), comprising:

(a) measuring current through an actuator coil to produce a plurality of current values, wherein each of the current values corresponds to a different current command that is provided to a VCM driver;

(b) measuring voltage across the actuator coil to produce a plurality of voltage values, wherein each of the voltage values corresponds to one of the current values;

(c) determining current differences between pairs of current values;

(d) determining voltage differences between pairs of voltage values; and (e) estimating coil resistance based on the current differences and the voltage differences.

25. The method of claim 24, wherein step (c) comprises determining current differences between pairs of current command values.

26. The method of claim 24, wherein step (c) comprises determining current differences between pair of current measurements.

27. A method for determining accurate estimates of coil resistance associated with an actuator coil of a voice coil motor (VCM), comprising:

(a) determining current differences between pairs of current values wherein each of the current values corresponds to a different current command that is provided to a VCM driver;

(b) determining voltage differences between pairs of coil voltages corresponding to the pairs of current commands; and (c) estimating coil resistance based on the current differences and the voltage differences.

28. The method of claim 27, wherein step (a) comprises determining current differences between pairs of current command values.

29. The method of claim 27, wherein step (a) comprises determining current differences between pairs of current measurements.

30. The method of claim 27, wherein step (c) includes:

determining an average of the current differences;

determining an average of the voltage differences; and estimating the coil resistance by dividing the average of the voltage differences by the average of the current differences.

31. The method of claim 27, wherein step (c) includes estimating the coil resistance using the following equation:

$$R_{coil} = \frac{\sum_{k=1}^{N} \Delta V_k \cdot \Delta I_k}{\sum_{k=1}^{N} \Delta I_k \cdot \Delta I_k},$$

where $R_{Coil}$ comprises an estimate of the coil resistance, $\Delta V_K$ comprises one of the voltage differences, $\Delta I_K$ comprises one of the current differences, and $N>1$.

32. The method of claim 27, further comprising:

(d) using the estimate of coil resistance to determine a back electromagnetic field (back EMF) voltage across the coil.

33. The method of claim 32, further comprising:

(e) using the back EMF to estimate coil velocity.

34. A method for determining accurate estimates of coil resistance associated with an actuator coil of a voice coil motor (VCM), comprising:

(a) sampling voltages across an actuator coil and a sense resistor, to produce a plurality of voltage values and corresponding current values, wherein each of the voltage values and its corresponding current value corresponds to a different current command that is provided to a VCM driver, and wherein each sampling occurs just prior to a new current command being provided to the VCM driver;

(b) determining current differences between pairs of current values;

(c) determining voltage differences between pairs of voltage values; and (d) estimating coil resistance based on the current differences and the voltage differences.

35. A method for determining accurate estimates of coil resistance associated with an actuator coil of a voice coil motor (VCM), comprising:

(a) sampling voltages across an actuator coil, wherein each of the coil voltage samples corresponds to a different current command that is provided to a VCM driver, and wherein each sampling occurs just prior to a new current commands being provided to a VCM driver, to produce a plurality of coil voltage samples;

(b) determining current differences between pairs of the current commands;

(c) determining voltage differences between pairs of the coil voltage samples; and (d) estimating coil resistance based on the current differences and the voltage differences.

36. A machine readable medium having instructions stored thereon that when executed by a processor cause a system to:

determine current differences between pairs of current values, wherein each of the current values corresponds to a different current command that is provided to a VCM driver;

determine voltage differences between pairs of coil voltages corresponding to the pairs of current values; and estimate coil resistance associated with an actuator coil of a voice coil motor (VCM) based on the current differences and the voltage differences.

37. The machine readable medium of claim 36, wherein the instructions that cause a system to estimate coil resistance include instructions that cause a system to:

determine an average of the current differences;

determine an average of the voltage differences; and estimate the coil resistance by dividing the average of the voltage differences by the average of the current differences.

38. The machine readable medium of claim 36, wherein the instructions that cause a system to estimate coil resistance include instructions that cause a system to estimate the coil resistance using the following equation:

$$R_{coil} = \frac{\sum_{k=1}^{N} \Delta V_k \cdot \Delta I_k}{\sum_{k=1}^{N} \Delta I_k \cdot \Delta I_k},$$

where $R_{coil}$ comprises an estimate of the coil resistance, $\Delta V_K$ comprises one of the voltage differences, $\Delta I_K$ comprises one of the current differences, and $N>1$.

39. A method for determining accurate estimates of coil resistance associated with an actuator coil of a voice coil motor (VCM), comprising:

(a) determining current differences between pairs of current measurements corresponding to current commands that are within an acceptable tolerance of estimated bias forces, wherein each of the current values corresponds to a different current command that is provided to a VCM driver;

(b) determining voltage differences between pairs of coil voltages corresponding to the pairs of current measurements; and (c) estimating coil resistance based on the current differences and the voltage differences.

40. A method for determining accurate estimates of coil resistance associated with an actuator coil of a voice coil motor (VCM), comprising:

(a) determining current differences between pairs of current commands values that are within an acceptable tolerance of estimated bias forces, wherein each of the current command values corresponds to a different current command that is provided to a VCM driver;

(b) determining voltage differences between pairs of coil voltages corresponding to the pairs of current commands; and (c) estimating coil resistance based on the current differences and the voltage differences.

* * * * *

UNITED STATES PATENT AND TRADEMARK OFFICE

CERTIFICATE OF CORRECTION

PATENT NO. : 7,009,806 B2
APPLICATION NO. : 10/369314
DATED : March 7, 2006
INVENTOR(S) : Fernando A. Zayas et al.

It is certified that error appears in the above-identified patent and that said Letters Patent is hereby corrected as shown below:

Column 9,
Line 28, replace “determine” with -- determining --;
Line 28, after “between” delete “a”;
Line 29, after “or” delete “a”;

Column 12,
Line 46, delete “,” after “resistor”.

Signed and Sealed this

Twenty-seventh Day of June, 2006

JON W. DUDAS
*Director of the United States Patent and Trademark Office*